US009874857B1

United States Patent
Keizer

(10) Patent No.: US 9,874,857 B1
(45) Date of Patent: Jan. 23, 2018

(54) SIMULATED MIRRORED DISPLAY APPARATUS AND METHOD

(71) Applicant: Fissix, LLC, Worthington, OH (US)

(72) Inventor: Floris Keizer, Worthington, OH (US)

(73) Assignee: FISSIX, LLC, Worthington, OH (US)

( * ) Notice: Subject to any disclaimer, the term of this patent is extended or adjusted under 35 U.S.C. 154(b) by 0 days.

(21) Appl. No.: 15/165,132

(22) Filed: May 26, 2016

Related U.S. Application Data

(60) Provisional application No. 62/184,323, filed on Jun. 25, 2015.

(51) Int. Cl.
G09G 5/00 (2006.01)
G04G 9/04 (2006.01)
G06F 3/00 (2006.01)
G06T 3/60 (2006.01)
G06T 11/60 (2006.01)

(52) U.S. Cl.
CPC ............. *G04G 9/04* (2013.01); *G06F 3/005* (2013.01); *G06T 3/60* (2013.01); *G06T 11/60* (2013.01)

(58) Field of Classification Search
CPC .......... G06T 15/50; G06T 19/006; G09G 2340/0492; G09G 2354/00; G09G 2356/00; G09G 5/377; G06F 19/16
USPC ....... 345/619, 632, 633, 647, 649, 660, 672, 345/156, 204
See application file for complete search history.

(56) References Cited

U.S. PATENT DOCUMENTS

| 8,588,033 B2 | 11/2013 | Di Borgo et al. | |
| 8,743,051 B1* | 6/2014 | Moy | G09G 5/00 345/156 |
| 2009/0251460 A1* | 10/2009 | Dunnigan | G06T 15/50 345/419 |
| 2010/0020070 A1* | 1/2010 | Hart | G01B 11/06 345/419 |
| 2013/0007874 A1* | 1/2013 | Purvis | G06F 21/32 726/19 |
| 2013/0016078 A1* | 1/2013 | Kodali | G09F 19/16 345/204 |
| 2014/0267412 A1* | 9/2014 | Calian | G09G 5/377 345/633 |
| 2015/0261300 A1* | 9/2015 | Masuko | G06F 3/017 345/156 |

OTHER PUBLICATIONS

Peter Eisert, et al., "Virtual Jewel Rendering for Augmented Reality Environments", 2010 17th IEEE International Conference on Image Processing (ICIP 2010), Hong Kong, Sep. 26-29, 2010, pp. 1813-1816.*

(Continued)

*Primary Examiner* — Jin-Cheng Wang
(74) *Attorney, Agent, or Firm* — Standley Law Group LLP

(57) ABSTRACT

A simulated mirrored display is disclosed. A camera captures and transmits an image to an electronic device. The electronic device alters the image to simulate material characteristics such as color, texture, opacity, and reflectivity of a manufactured good to be simulated. Additionally, images of components of the manufactured good may be superimposed on the image and likewise modified. The altered image is displayed on an electronic display.

20 Claims, 4 Drawing Sheets

(56) References Cited

OTHER PUBLICATIONS

Forza One Studios, Luxury Watch Faces for Wear, https://play.google.com/store/apps/details?id=com.goldenbrown.watches&hl=en, site visited May 13, 2015.
Zuhanden, Ranger Military Watch Face, https://play.google.com/store/apps/details?id=co.smartwatchface.watch.face.ranger.military&hl=en, site visited May 13, 2015.
MemoMi Labs Inc., http://memorymirror.com/, site visited May 13, 2015.
Android, Android Wear, https://www.android.com./intl/en_us/wear/, site visited May 13, 2015.
Android Virtual Watches, http://virtual-chrono-watches-livewp.android.informer.com/, site visited May 13, 2015.

* cited by examiner

SIMULATED MIRRORED DISPLAY APPARATUS AND METHOD

CROSS-REFERENCE TO RELATED APPLICATION

This application claims the benefit of U.S. Provisional Patent Application Ser. No. 62/184,323 filed Jun. 25, 2015, the substance of which is hereby incorporated by reference as if restated in its entirety.

TECHNICAL FIELD

Embodiments of the present invention generally relate to simulated displays, particularly those that simulate a semi- or completely reflective surface.

BACKGROUND AND SUMMARY OF THE INVENTION

Electronic display devices are sometimes used in lieu of manufacturing tangible goods. Some examples include posters, billboards and menus. In some cases, manufacturing an electronic display device and developing a digital image is cheaper than manufacturing the tangible good itself. Even if more expensive to produce initially, electronic display devices have the advantage of being highly adaptable because a new image can be substituted in for an old one in little time with little cost. This substitution may occur in real time. This may also allow the display to be interactive, as the display adapts in substantially real time to events occurring around or near the electronic display.

As electronic displays have become more advanced, their ability to simulate tangible goods has increased. To fully capture and display a desired expression digitally, it would be advantageous to provide an electronic display device capable of capturing and displaying the subtleties and nuisances of tangible goods. Further, consumers are drawn to electronic display devices capable of simulating tangible goods with a high level of realism.

One such detail of realism often lost in an electronic display is reflection. For example, if an electronic display device is made to project an image simulating a metallic sign, the electronic display device typically lacks the ability to simulate how the metallic sign would reflect ambient light if the metallic sign were a tangible good. This hinders, if not destroys altogether, the sense of realism in the electronic image. Likewise, a greater sense of realism can be accomplished in part by simulating a reflective surface on electronic display devices. Effectively simulating a reflective surface additionally provides for another means of creative expression in design. Additionally, the simulated reflective surface provides a means to make the display interactive. For example, one could peer closely at the display and see one's reflection.

Therefore, to provide an electronic display with a high level of realism, it would be advantageous to provide an electronic display device having an electronic display capable of simulating a mirrored surface.

To provide such a device, exemplary embodiments of the present invention are directed to an electronic display device configured to simulate a mirrored surface. The electronic display device may comprise a camera. The camera is preferably positioned near an edge of the electronic display device. The camera may be configured to capture an image for simulated reflection. To capture the proper image for reflection, the camera may be directed such that it faces in substantially the same direction as the electronic display device. To simulate a reflection, the captured image may by flipped horizontally. The captured image may be mapped and corresponding qualities of reflectivity and material characteristics may be superimposed on sections of the captured image to reflect the corresponding reflectivity and material characteristics. This may be accomplished through modifications to the image such as by obscuration and distortion, including imparting a color tint and other known methods of image modification. The combined image may be displayed on the electronic display. The process may be repeated continuously, including in substantially real time, thereby rendering a simulated reflective surface.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
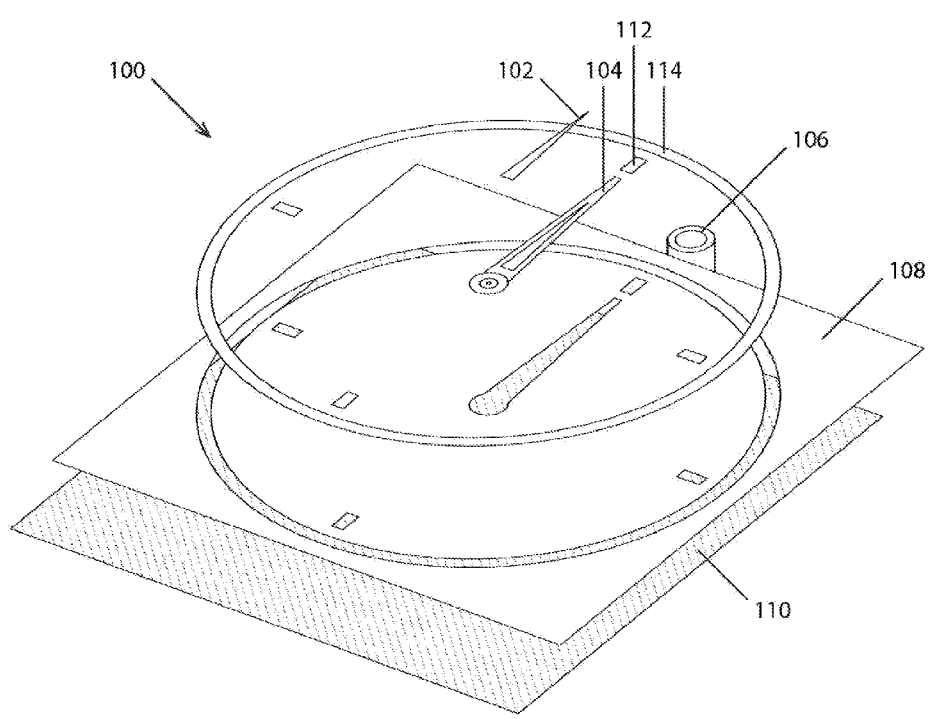
FIG. 1 illustrates a front exploded view of an exemplary embodiment of the simulated mirrored display.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a front exploded view of an exemplary embodiment of the simulated mirrored display. The simulated mirrored display may comprise an electronic display device 100. The electronic display device 100 may comprise an electronic display that is capable of displaying relatively fine detail in a variety of colors and can be configured to create multiple layers of images. The simulated mirrored display may further comprise a camera 106, preferably located along one of the edges of the electronic display device 100. To capture the proper image for reflection, the camera 106 may be directed such that it faces in substantially the same direction as the electronic display device 100. The camera 106 may be integrated with a frame of the electronic display device 100. The camera 106 may be positioned and configured to capture an image that would be reflected on the surface of the electronic display if the electronic display device 100 were comprised of a reflective material, hereinafter the "captured image" 110.

As will be explained in greater detail, the camera 106 may be connected to an electronic device 202 such as the one illustrated FIG. 2. The electronic device 202 may be one known in the art and may comprise known processing and memory components capable of receiving, storing, analyzing, altering, and transmitting an image. The electronic device 202 may be located within the electronic display device 100 or elsewhere. The captured image 110 may be stored, analyzed, altered and transmitted, and hereinafter be referred to as the "altered image." The altered image may be comprised of several layers, each simulating the reflective and material characteristics of the different parts of a tangible good to be simulated. Alternatively, the altered image may not simulate a tangible good or other object, but instead may represent a unique set of reflective and material characteristics to be imparted on the captured image 110.

FIG. 1 illustrates the simulated mirrored display through the example of a watch face. It is notable that this example is merely illustrative and intended to assist the reader with their understanding of the inventive concept. These examples are not intended to be limiting. The present invention may be used to simulate any material or good, manufactured or otherwise, without departing from the spirit of the invention. The captured image 110 may be flipped horizontally to simulate a reflection. In FIG. 1, the electronic display device 100 comprises the captured image 110, a surface image 108, and a number of part images such as a minute hand 104, a fluorescent layer 102, at least one marker 112, and a bezel 114. The electronic device 202 may be pre-programmed to alter the surface image 108, the minute hand 104, the fluorescent layer 102, the marker 112, and the bezel 114 (or any parts of an image) in different ways to simulate different material qualities.

The electronic device 202 may be configured to superimpose a number of layers on the captured image 110, thereby altering the image observed by a user. For example, without limitation, the surface image 108 may be superimposed on the captured image 110, thereby partially or completely masking the captured image 110. The combined altered image is displayed on the electronic display device 100.

For example, without limitation, the altered image may simulate a gold, textured surface 108 of a watch face. The electronic device 202 may be configured to alter the minute hand 104 to simulate a smooth, black, metallic surface of a minute hand of the watch, and likewise, the fluorescent layer 102 to simulate a fluorescent paint layer placed on the surface of the minute hand 104. The electronic device 202 may be further configured to alter the marker 112 to simulate a smooth, white, metallic surface of an hour marker of the watch. The markers 112 may be located, for example, at the noon, 3, 6, and 9 o'clock positions, though any number of markers 112 at any number of locations are contemplated. Similarly, the electronic device 202 may be configured to alter the bezel 114 to simulate a textured, silver, raised, metallic surface of a bezel of the watch.

In this example, when the user observes the electronic display device 100, the user may view a simulated reflected image of themselves and other captured background altered by a digital overlay such that the image appears to have been reflected from the smooth, black, metallic surface of a minute hand 104 of the watch. Likewise, when the user observes other portions of the electronic display device 100, the user may view a reflected image of themselves and other captured background altered by a digital overlay such that the image appears to have been reflected from the gold, textured surface of the watch face 108.

Any number of sections of the captured image may be altered based on any number of characteristics related to reflectivity or the simulated material's other properties. Additionally, altered sections of the captured image may overlap with one another or may be altered more than once. The electronic device 202 may be configured to simulate any number of materials and parts. Further, the electronic device 202 may be configured to switch between any number of sets of pre-configured materials and parts. In an embodiment of the present invention, the electronic device 202 may comprise a library of pre-configured materials and parts, or set of material and parts, which the user may select from. The electronic display device 100 may further comprise an input device 204, as illustrated in FIG. 2, which permits the user to make such a selection. In other exemplary embodiments of the present invention, the input device 204 may have any number of individual selection devices, which permit the user to make multiple different selections. In still other embodiments, multiple input devices 204 may be utilized. The input device 204 may be a button, switch, touch screen, or the like, and further may comprise any number or combination of such components. Again, as an example without limitation, the electronic device 202 may be configured to switch between several different watch faces, each with different corresponding materials and parts. The electronic device 202 may be in communication with the input device 204 to receive the selection made by the user. As will be explained in greater detail, a new selection may be made at any time.

Figure 2:
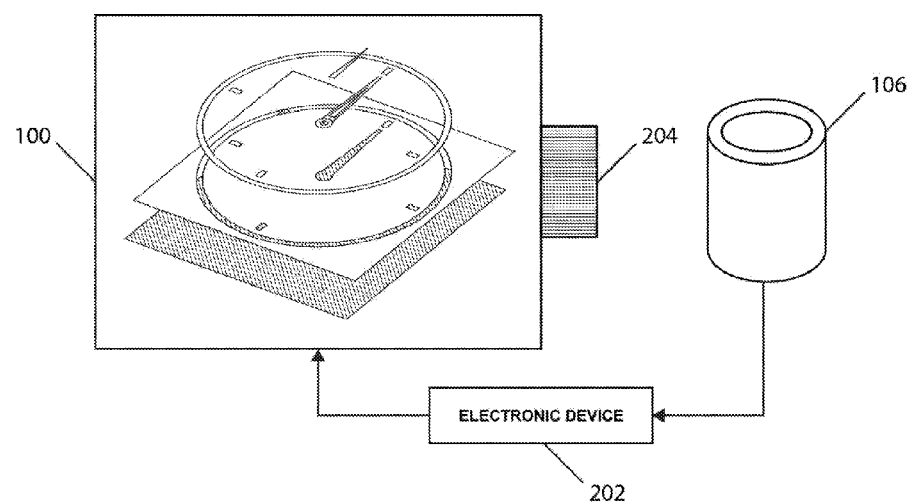
FIG. 2 illustrates an exemplary system for the simulated mirrored display.

FIG. 2 illustrates an exemplary embodiment of the present invention for creating the simulated mirrored display. The camera 106 may capture and transmit the captured image to the electronic device 202. The electronic device 202 may be integrated with the electronic display device 100. As discussed, the electronic device 202 may flip the image horizontally to simulate a reflection. The electronic device 202 may be further pre-programmed to store and analyze the captured image for reflective conditions, such as but not limited to, the ambient light conditions and the angle of the received light. The electronic device 202 may be further pre-programmed to map the captured image and superimpose simulated reflective qualities and other material characteristics on portions of the captured image based on any number of factors including, but not limited to, color, transmission, scattering, and absorption properties of the materials being simulated.

As discussed, portions of the captured image may be superimposed with different simulated reflective and material qualities to simulate different parts and materials. The electronic device 202 may be configured to switch between any number of simulated materials or parts, such as the example of a watch face illustrated in FIG. 1. The electronic device 202 may accomplish this simulation by superimposing opaque or translucent layers above the captured image to simulate the reflective qualities and parts or by other known digital image modification techniques. When superimposed these layers may, for example without limitation, impart or remove color from, or change the resolution, brightness, focus, warmth, and contrast of the captured image. The electronic device 202 may transmit this superimposed image to the electronic display device 100 to be displayed. This process may be repeated continuously in substantially real time.

Figure 3:
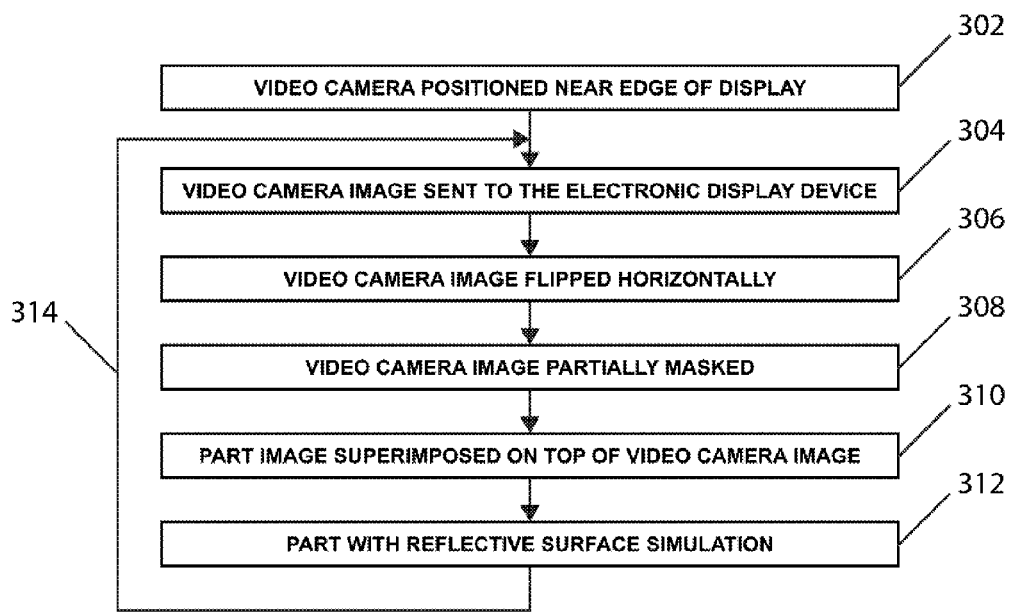
FIG. 3 illustrates an exemplary method for the simulated mirrored display.

FIG. 3 illustrates an exemplary method for the simulated mirrored display. As discussed, in step 302 the camera 106, which is preferably located near an edge of the electronic display device 100, may capture the captured image. To capture the proper image for reflection, the camera 106 may be directed such that it faces in substantially the same direction as the electronic display device 100. In step 304 the camera 106 may transmit the captured image to the electronic display device 100. In step 306 the captured image may be flipped horizontally, as a naturally reflected image would be.

In step 308 the captured image may be partially masked, for example and not to serve as a limitation, by superimposing a translucent or opaque layer. Said layer may have a color tint. Other known image modification techniques are contemplated. The opaqueness of the layer may be determined by the pre-selected reflective and material characteristics designated to be simulated, optionally in combination with ambient conditions such as the amount of ambient light.

The optional additions based on ambient conditions may be automatically determined by an analysis performed of the captured image by the electronic device 202. In an exemplary embodiment of the present invention, the user may be able to modify or override these automatic selections. The reflective and material characteristics or sets of characteristics may be selected by the user. In alternative embodiments, these characteristics or set of characteristics may be selected by default, or be selected automatically by design. In exemplary embodiments of the present invention, several pre-selected characteristics or sets of characteristics may be available and the user may change the selection at any time. In still other embodiments of the present invention, the device may cycle through several pre-selected characteristics or sets of characteristics automatically.

In step 310 any number of part images may be superimposed on the captured image. Similar to step 308, each part image may comprise additional or unique reflectivity or other material characteristics, and may have additional layers superimposed on each part to simulate the reflectivity and material characteristics of each part. These imparted characteristics may be based on the material they are intended to simulate. Alternatively, the imparted characteristics may be based on a combination of characteristics not otherwise found in tangible goods or nature.

In step 312 the electronic display device 100 displays the superimposed image to create the simulated mirrored display. As illustrated at 314, this process may be repeated continuously, including in substantially real time.

Figure 4:
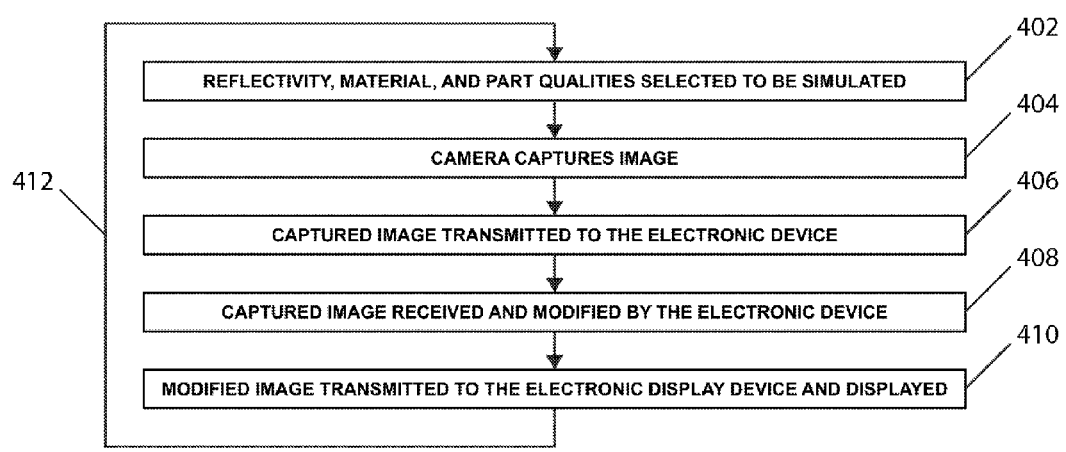
FIG. 4 illustrates another exemplary method for the simulated mirrored display.

FIG. 4 illustrates another exemplary method for the simulated mirrored display. In step 402 a set of reflectivity, material, and other part qualities are selected to be simulated. As discussed, in exemplary embodiments of the present invention these qualities may be selected by the user via the input device 204. In alternative embodiments, these qualities may be selected by default, or be selected automatically by design. In other exemplary embodiments of the present invention, several pre-selected sets of qualities may be available and the user may change the selection at any time. In still other embodiments of the present invention, the device may cycle through several pre-selected sets of qualities automatically. The selection may be transmitted to and stored by the electronic device 202. It is notable that the user may change the input, such as via the input device 204, for step 402 at any point, thereby changing the selection of the product to be simulated the next cycle the steps are repeated.

In step 404, the camera 106 may capture the captured image. Then in step 406 the captured image may be transmitted to the electronic device 202. In step 408 the electronic device 202 may receive and processes the captured image. The captured image may be modified based on the selection made in step 402. Modification of the captured image may include mapping the image and superimposing reflectivity, material, and part qualities onto different locations of the mapped image. The modification may be based on factors including, but not limited to color, transmission, scattering, and absorption qualities of the material to be simulated. In other embodiments of the present invention, the captured image may be analyzed and further modified based on this analysis to compensate for ambient conditions such as the amount of ambient light and the angle of incoming light. Next, in step 410 the modified image may be transmitted to the electronic display device 100 where it is displayed.

It is notable that any number of these steps may be combined into a single step, re-ordered, or be executed simultaneously. Additionally, as illustrated at 412, this process may be repeated continuously. This may provide a substantially real-time simulated mirrored display.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An apparatus for digitally simulating a tangible object comprising:
    an electronic display having a viewing surface;
    an image capture device configured to capture a background image, the background image representative of an image that would be reflected by the viewing surface of the electronic display if the electronic display viewing surface was reflective; and
    an electronic device in communication with the electronic display and the image capture device, the electronic device configured to:
        receive the background image from the image capture device, create an altered image by flipping the background image horizontally and applying at least virtual reflective characteristics to objects appearing in the background image, and superimpose multiple component image layers over the altered image, each component image layer displaying a different simulated component of the tangible object;

wherein, the composite of the altered image and the layers of superimposed simulated components will result in the appearance of a simulated tangible object on the electronic display.

2. The apparatus of claim 1 wherein the electronic device is further configured to apply virtual reflective and material characteristics to the simulated tangible object components contained in the component image layers.

3. The apparatus of claim 2 wherein:

the virtual material characteristics comprise color, texture, opacity, and reflectivity.

4. The apparatus of claim 1 wherein:

the electronic device is configured to further modify the captured image to correspond with ambient light conditions.

5. The apparatus of claim 1 wherein:

the electronic device is configured to assign the simulated components to a given component image layer based on simulated component type.

6. The apparatus of claim 1 wherein:

the image capture device is integrated with the frame of the electronic display.

7. The apparatus of claim 1 wherein:

the simulated tangible object components are selectable from a plurality of pre-stored components.

8. The apparatus of claim 7 further comprising:

an input device for permitting a user to select from the plurality of pre-stored simulated components and to exchange the displayed simulated components.

9. The apparatus of claim 1 wherein:

the simulated tangible object is a watch face.

10. The apparatus of claim 9 wherein:

the simulated components of the watch face are selectable from the group consisting of a watch face surface, a watch hand, a fluorescent watch hand paint layer, a marker, and a bezel.

11. The apparatus of claim 1 wherein:

the electronic device is further configured to continuously display the simulated tangible object.

12. The apparatus of claim 11 wherein:

the electronic device is further configured to change the appearance of the simulated tangible object in real time.

13. A method for producing a simulated image of a manufactured good having a reflective surface, the method comprising:

providing an electronic display having a viewing surface and configured to display the simulated image;

capturing a background image within view of the electronic display viewing surface;

transmitting the background image to an electronic device;

using the electronic device to generate the simulated image by:

creating an altered image by flipping the background image horizontally and applying at least virtual reflective characteristics to objects appearing in the background image, superimposing a multiple component image layers over the altered image, each component image layer displaying a different simulated component of the selected manufactured good, and simulating the reflection of objects in the altered image in at least some of the simulated components of the selected manufactured good; and displaying the simulated image on the electronic display.

14. The method of claim 13 further comprising the step of:

selecting the manufactured good to be simulated.

15. The method of claim 13 wherein:

the simulated image is continuously displayed on the electronic display.

16. The method of claim 15 wherein:

the simulated components used to create the simulated image are selectable and exchangeable by a user.

17. The method of claim 13 wherein:

the manufactured good to be simulated is a timepiece.

18. The method of claim 13 further comprising:

simulating other material qualities of the simulated manufactured good components, the other material qualities selected from the group consisting of color, texture, opacity, and combinations thereof.

19. The method of claim 13 further comprising:

using the electronic device to repeatedly change in real time at least one of the simulated components on at least one of the multiple component image layers.

20. A system for producing a simulated image of a watch face having a reflective surface comprising:

an electronic display having a viewing surface and configured to display the simulated image;

a camera for capturing a background image, the camera pointing substantially away from the display viewing surface;

an input device for selecting a watch face to be simulated;

an electronic device in communication with the electronic display and the camera, the electronic device configured to generate the simulated image by:

creating an altered image by flipping the background image horizontally and applying at least virtual reflective characteristics to objects appearing in the background image, superimposing multiple component image layers over the altered image, each component image layer containing a different simulated component of the selected watch face, simulating the reflectivity and other material qualities of the selected watch face, including the simulated components thereof, the other material qualities selected from the group consisting of color, texture, opacity and combinations thereof, and matching ambient light conditions;

wherein the camera is positioned in close proximity to the electronic display; and wherein the simulated image of the watch face displayed on the electronic device will be a composite comprising the altered image and the superimposed component image layers.

* * * * *